(12) United States Patent
Sarsen et al.

(10) Patent No.: US 8,424,372 B2
(45) Date of Patent: Apr. 23, 2013

(54) SYSTEM AND METHOD FOR ESTABLISHING A MASS FLOW RATE OF AIR ENTERING AN ENGINE

(75) Inventors: Douglas Christopher Sarsen, Howell, MI (US); Christopher Whitt, Howell, MI (US); Rebecca J. Darr, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 132 days.

(21) Appl. No.: 13/102,170

(22) Filed: May 6, 2011

(65) Prior Publication Data

US 2012/0279291 A1    Nov. 8, 2012

(51) Int. Cl.
*G01M 15/04* (2006.01)
(52) U.S. Cl.
USPC .................................................. 73/114.32
(58) Field of Classification Search ........... 73/114.31, 73/114.32, 114.33, 114.34, 114.35
See application file for complete search history.

(56) References Cited

U.S. PATENT DOCUMENTS

2002/0108432 A1 *  8/2002  Maloney ................... 73/118.1
2006/0173607 A1 *  8/2006  Matsuo ........................ 701/114

* cited by examiner

*Primary Examiner* — Eric S McCall
(74) *Attorney, Agent, or Firm* — Quinn Law Group, PLLC

(57) ABSTRACT

A method of establishing a mass flow rate of air entering an engine includes establishing an input voltage by an energy supply device to energize a mass-air-flow sensor. The method also includes generating an output frequency via the mass-air-flow sensor in response to the mass flow rate of air entering the engine and determining the flow rate using the generated output frequency. The method additionally includes comparing the generated output frequency with a predetermined threshold output frequency that corresponds to the established input voltage. Additionally, the method includes selecting the determined flow rate as the established flow rate if the generated output frequency is at or below the predetermined threshold output frequency. Furthermore, the method includes selecting a predetermined alternative algorithm to generate the established flow rate if the generated output frequency is above the predetermined threshold output frequency. A system for establishing the mass flow rate is also provided.

20 Claims, 1 Drawing Sheet

SYSTEM AND METHOD FOR ESTABLISHING A MASS FLOW RATE OF AIR ENTERING AN ENGINE

TECHNICAL FIELD

The present invention is drawn to a system and a method for establishing a mass flow rate of air entering an internal combustion engine.

BACKGROUND

In modern internal combustion engines, such as those used to power automobiles, the mass flow rate of air entering the engine is commonly determined by a mass-air-flow (MAF) sensor. The MAF sensor is designed to respond to the amount of air flowing through a chamber containing the sensor, and is generally intended to be insensitive to the density of the flow of air being measured. Typically, MAF sensors do not measure the mass of air flow directly.

A commonly used type of an MAF sensor employs a hot wire. Such a hot wire MAF sensor measures a frequency response of the heated wire and the temperature of the air flowing past the sensor. The frequency response of the hot wire and temperature of the air flow are communicated to the engine control unit, which permits the control unit to accurately determine the mass flow rate of air entering the subject engine.

The engine control unit uses the mass air flow determined by the MAF sensor to balance and deliver the correct fuel mass to the combustion chamber(s) of the engine. Besides being used to control the engine's internal combustion process, the mass of air flow determined by the MAF sensor may also be employed to control other vehicle systems that are affected by the engine's combustion.

SUMMARY

A method of establishing a mass flow rate of air entering an internal combustion engine includes establishing an input voltage by an energy supply device to energize a mass-air-flow sensor. According to the method, the subject mass-air-flow sensor is configured to respond to the mass flow rate of air entering the engine. The method also includes generating an output frequency via the mass-air-flow sensor in response to the mass flow rate of air entering the engine and determining the mass flow rate of air entering the engine using the generated output frequency. The method additionally includes comparing the generated output frequency with a predetermined threshold output frequency that corresponds to the established input voltage. Additionally, the method includes selecting the determined mass flow rate of air as the established mass flow rate of air entering the engine if the generated output frequency is at or below the predetermined threshold output frequency. Furthermore, the method includes selecting a predetermined alternative algorithm to generate the established mass flow rate of air entering the engine if the generated output frequency is above the predetermined threshold output frequency.

The predetermined alternative algorithm may include a look-up table of engine speed, engine fueling rate, and engine volumetric efficiency values versus flow rate values of air mass entering the engine. According to the method, the flow rate values of air mass entering the engine may include effects of at least one of engine exhaust gas recirculation and boost pressure generated by a compressor configured to increase power output of the engine.

Each of the generating an output frequency, the calculating an indicated flow rate, the comparing the generated output frequency with a predetermined threshold output frequency, the selecting the determined mass flow rate of air as the established flow rate, and the selecting the predetermined alternative algorithm to generate the established flow rate may be executed by a controller operatively connected to the engine.

The comparing the generated output frequency with the predetermined threshold output frequency may be accomplished when the input voltage drops below a threshold value. Such a threshold value of the input voltage may be approximately 12 volts, in a non-limiting example.

The established mass flow rate of air may be used to regulate regeneration of an exhaust after-treatment device operatively connected to the engine. Additionally, the established mass flow rate of air may be used to regulate combustion in the engine.

A system for establishing a mass flow rate of air entering an internal combustion engine and a vehicle employing such a system are also provided.

The above features and advantages and other features and advantages of the present invention are readily apparent from the following detailed description of the best modes for carrying out the invention when taken in connection with the accompanying drawings.

DETAILED DESCRIPTION

Figure 1:
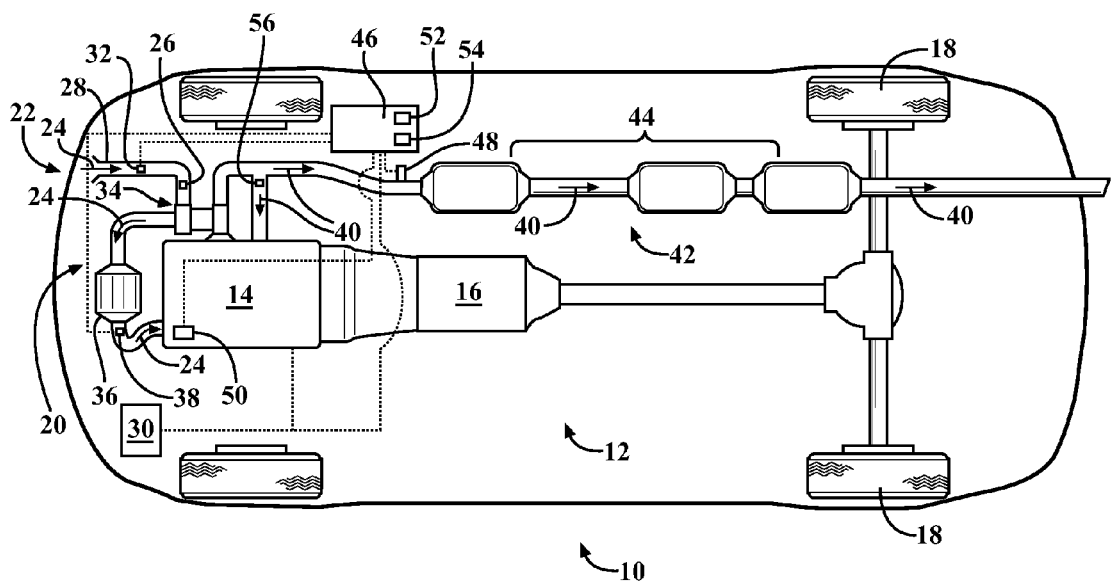
FIG. 1 is a schematic illustration of a vehicle employing an internal combustion engine and a mass-air-flow sensor adapted for determining a mass flow rate of air entering the engine.

Referring to the drawings, wherein like reference numbers refer to like components throughout the several views, FIG. 1 schematically depicts a vehicle 10. The vehicle 10 employs a powertrain 12. The powertrain 12 includes an internal combustion engine 14, a transmission 16, and drive wheels 18, wherein the engine is configured to power the vehicle by sending engine torque through the transmission to the drive wheels. The engine 14 may be a diesel or a compression-ignition type, or a spark-ignition type of an engine. Although the vehicle 10 is depicted having a standard powertrain 12, where the primary powerplant is the engine 14, the vehicle may also be a hybrid type, where one or more electric motors (not shown) are used in powering the vehicle.

The vehicle 10 also includes a system 20 which incorporates an arrangement of components that interact for establishing a mass flow rate of air entering the engine 14 that is delivered for subsequent combustion inside the engine. The system 20 includes an air intake system 22 that is connected to the engine 14. The air intake system 22 is configured to deliver an ambient air flow 24 to the engine 14 for subsequent combining of the air flow and an appropriate amount of fuel inside the engine's combustion chambers. The air intake system 22 includes a mass-air-flow (MAF) sensor 26 located inside an air duct 28. The MAF sensor 26 is configured to sense the mass flow rate of air moving through the duct 28 and generate an output frequency signal representative of the rate of the mass air flow entering the engine 14.

The MAF sensor 26 includes a hot wire (not shown) suspended in the air flow 24 inside the duct 28. The wire senses the air flow 24 when heated with an electric current. The wire's electrical resistance increases in response to the wire's temperature, which in turn limits electrical current flowing through an electrical circuit of the MAF sensor 26. A flow of air past the MAF sensor 26 cools the wire, thereby decreasing the wire's resistance, which in turn allows more current to flow through the sensor's circuit. As more current flows, the wire's temperature increases until the wire's resistance again reaches equilibrium. The amount of current required to maintain the wire's temperature is directly proportional to the mass rate of air flow 24 flowing past the wire. An input voltage for driving the current across the wire of the MAF sensor 26 and thereby energizing the MAF sensor is established by an energy supply device 30. The energy supply device 30 is mounted on board the vehicle 10 and may be configured as an energy storage device, such as one or more batteries, or an alternator.

The temperature of the air flow 24 entering engine 14 is monitored by a sensor 32. The air intake system 22 includes a compressor 34. The compressor 34 is depicted as an engine exhaust-driven turbocharger, but may also be a mechanically driven supercharger. The compressor 34 is operable to increase volumetric efficiency of the engine 14 by pressurizing the incoming air flow for subsequent delivery of the pressurized air charge to the engine's combustion chambers. The air intake system 22 also includes a charge air cooler 36 for reducing the temperature of the pressurized air flow in order to additionally improve the operating efficiency of the engine 14. The temperature of the air flow 24 following the charge air cooler 36 is monitored by a sensor 38. As shown, compressor 34 is energized by an exhaust gas flow 40 that is released by the engine 14 following each combustion event.

The compressor 34 is connected to an exhaust system 42, which includes an exhaust after-treatment device 44. In the event that the engine 14 is a compression ignition engine, the exhaust after-treatment device 44 is a particulate filter adapted to collect and dispose of the sooty particulate matter emitted by the engine prior to discharge of the exhaust gas flow 40 to atmosphere. Accordingly, the exhaust after-treatment device 44 may include such exhaust emission devices as a diesel oxidation catalyst and a selective catalytic reduction catalyst.

Typically, the exhaust after-treatment device 44 is required to be regenerated or cleaned after some particular amount of soot is reached or collected therein to burn off the collected particulates prior to the occurrence of any damage to the device. As is known, a significant accumulation of hydrocarbon emissions on the exhaust after-treatment device 44 may cause elevated temperatures and eventual damage to the device. Regeneration of the after-treatment device 44 may be regulated by the controller 46 in response to the determined mass flow of air that has been consumed by the engine 14 for combustion over a period of time. The exhaust after-treatment device 44 may be regenerated using high temperature exhaust to burn particles that may otherwise accumulate and clog the system. The exhaust after-treatment device 44 may also be regenerated by directly injecting and igniting fuel in the exhaust gas flow 40. In such a case, controller 46 may be programmed to command the fuel to be injected into the exhaust system 42 at an appropriate time.

In the event that the engine 14 is a gasoline or spark ignition engine, the exhaust after-treatment device 44 may be a gas-engine-specific three-way catalytic converter. As understood by those skilled in the art, a three-way catalytic converter is an exhaust after-treatment device that simultaneously performs three tasks: i) oxidation of nitrogen oxides, ii) oxidation of carbon monoxide, and iii) oxidation of unburned hydrocarbons. Similarly to the diesel-engine-specific exhaust after-treatment device, the three-way catalytic converter may be regenerated to unload the deposited hydrocarbon emissions in order to forestall elevated temperatures in the catalyst that may eventually cause damage.

The system 20 additionally includes a controller 46 operatively connected to the engine 14. The controller 46 is configured to regulate the operation of the combustion process in the engine 14, and may be additionally configured to regulate other components that are part of the powertrain 12, such as the transmission 16. The MAF sensor 26 communicates the output frequency signal representative of the rate of mass air flow entering the engine 14 to the controller 46. The controller 46 is programmed to receive the output frequency generated by the MAF sensor 26.

The controller 46 is also programmed to determine the mass flow rate of air entering the engine 14 using the generated output frequency and additional inputs from other sensors, such as an oxygen ($O_2$) sensor 48 and/or a manifold absolute pressure (MAP) sensor 50. The use of additional input from such sensors typically increases the accuracy of the mass of air flow value determined by the controller 46. Accordingly, such additional sensor input serves to improve stability of the regulated combustion process in the engine 14, as well as the accuracy in regulating other devices, such as the exhaust after-treatment device 44, whose operation is affected by the flow rate of the air mass entering the engine.

In certain circumstances, the input voltage established by the energy supply device 30 may drop from its target value of approximately 13.5 volts. Additionally, the input voltage established by the energy supply device 30 may even drop below a threshold value that is specific to each particular MAF sensor. The threshold value of the input voltage represents an input voltage below which the MAF sensor 26 begins to generate an output frequency that incorrectly represents the rate of the mass air flow entering the engine 14. Such a voltage drop may, for example, occur as a result of a charging system malfunction. Typically, when the input voltage is reduced below the threshold value, the rate of mass air flow entering the engine 14 as determined by the controller 46 may be misrepresented on the low side. According to the testing conducted on a representative MAF sensor, as the input voltage is reduced, the output frequency generated by the MAF sensor tends to misrepresent the actual rate of mass air flow at larger mass flows. In addition, similarly based on the testing conducted on a representative MAF sensor, the threshold value of the input voltage may be equal to approximately 12 volts.

In view of the possible misrepresentation of the rate of mass air flow at reduced input voltages, the controller 46 is programmed to compare the generated output frequency with a predetermined threshold output frequency 52 when the input voltage drops below the threshold value. The predetermined threshold output frequency 52 is the output frequency that correctly corresponds to the input voltage established by the energy supply device 30. Additionally, the controller 46 is programmed to select the determined mass flow rate of air as the established flow rate of the air mass entering the engine 14 if the generated output frequency is at or below the predetermined threshold output frequency. Accordingly, the established mass flow rate of air is the value of the flow rate that is to be used for regulating the combustion of the engine 14 and the regeneration of the exhaust after-treatment device 44 by the controller 46.

An appropriate range of output frequencies that correctly correspond to the input voltages is predetermined during calibration of the MAF sensor 26. Additionally, as noted above in a non-limiting example, the predetermination of the range of such "correctly corresponding" output frequencies may be used to establish the threshold value of the input voltage, which may be equal to approximately 12 volts. The target value of the input voltage, which may be equal to approximately 13.5 volts for a particular MAF sensor 26, may be similarly established.

The controller 46 is also programmed to select a predetermined alternative algorithm to generate the established mass flow rate of air entering the engine 14 when the generated output frequency is below the predetermined threshold output frequency 52 at a specific voltage. Additionally, the selection of the predetermined alternative algorithm may be performed when the input voltage drops below the established threshold value. The predetermined alternative algorithm includes a determination of the appropriate flow rate values of the air mass entering the engine 14 at a particular instance during engine operation.

To determine the appropriate mass air flow rate values, the predetermined alternative algorithm employs ranges of values of engine operating parameters that are correlated to the mass flow rate of air used by the engine 14. The predetermined alternative algorithm may, for example, correlate mass air flow rate values with such measurable or known engine parameters as operating speed, fueling rate, and volumetric efficiency. Accordingly, the predetermined alternative algorithm permits an empirically and/or mathematically determined correlation between targeted engine operating parameters and mass flow rate of air to be used for establishing the flow rate of the air mass entering the engine 14 at a particular instance. Additionally, the predetermined alternative algorithm may include a mathematical simulation of fueling rate and speed of the engine 14 to regulate the regeneration of the after-treatment device 44.

The predetermined alternative algorithm may include a look-up table 54 programmed into the controller 46, wherein the look-up table includes a range of engine speed, engine fueling rate, and engine volumetric efficiency values versus flow rate values of the air mass entering the engine 14. Thus programmed into the controller 46, the look-up table 54 remains available for subsequent access during actual operation of the engine 14. Where the predetermined alternative algorithm includes the use of the look-up table 54, the correlation between specific engine operating parameters and mass flow rate of air is typically determined empirically during the testing and calibration stages of engine development. The look-up table 54 may additionally be used by the controller 46 to determine the variation in the amount of soot mass collected in the after-treatment device 44 in order to subsequently trigger the appropriate regeneration of the after-treatment device.

The predetermined alternative algorithm may include the effects of other operating parameters that influence a fuel-air ratio of the combustible mixture entering engine 14. For example, the predetermined alternative algorithm may include the additional effects of increased density of the air flow 24 resulting from the boost pressure generated by the compressor 34. The predetermined alternative algorithm may also account for the amount of exhaust gas recirculation (EGR) introduced into the combustion chambers of the engine 14 during a particular time frame that an EGR valve 56 is on. As is appreciated by those skilled in the art, when the EGR valve 56 is on, the fuel-air mixture becomes richer because the re-circulated exhaust gas flow 40 includes unburned fuel which is reintroduced for combustion. Accordingly, when the EGR valve 56 is on, the amount of fresh air flow 24 introduced into the engine's combustion chambers is generally decreased, while the mass of soot collected in the after-treatment device 44 is typically increased.

Overall, regardless of the specific parameters employed in the predetermined alternative algorithm, the alternative algorithm is useful for establishing the flow rate of the air mass. Furthermore, the predetermined alternative algorithm becomes particularly useful for establishing the mass air flow rate when the generated output frequency is above the predetermined threshold output frequency as a result of the drop in input voltage.

Figure 2:
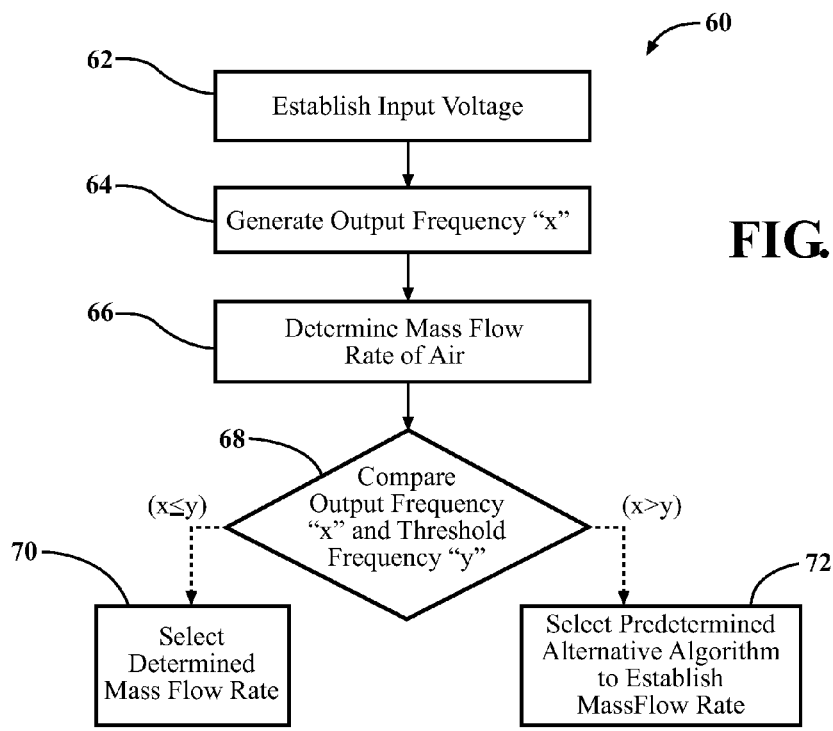
FIG. 2 is a flow diagram of a method of establishing a mass flow rate of air entering an internal combustion engine shown in FIG. 1.

FIG. 2 depicts a method 60 of establishing a mass flow rate of air entering the engine 14 via the system 20, as described with respect to FIG. 1. The method commences in frame 62, where it includes establishing an input voltage by the energy supply device 30 to energize the MAF sensor 26. Following frame 62, the method proceeds to frame 64, where it includes generating an output frequency "x" via the MAF sensor 26 in response to the air flow 24 inside the duct 28. As described above with respect to FIG. 1, the output frequency "x" generated by the MAF sensor 26 is indicative of the flow rate of the air mass entering the engine 14.

After the output frequency has been generated via the MAF sensor 26 in frame 64, the method advances to frame 66. In frame 66, the method includes determining the mass flow rate of air entering the engine 14 using the generated output frequency "x". Following frame 66, the method proceeds to frame 68 where it includes comparing the generated output frequency "x" with a predetermined threshold output frequency "y" that corresponds to the established input voltage. In FIG. 2, the result of the comparison made in frame 68 is indicated as "x≧y" if the generated output frequency "x" is determined to be at or above the predetermined threshold output frequency "y", and as "x<y" if the generated output frequency is determined to be below the predetermined threshold output frequency.

If in frame 68 it has been determined that the generated output frequency "x" is at or below the predetermined threshold output frequency "y", the method moves to frame 70, where it includes selecting the determined mass flow rate of air as the established flow rate of the air mass entering the engine 14. On the other hand, if in frame 68 it has been determined that the generated output frequency "x" is above the predetermined threshold output frequency "y", the method proceeds to frame 72 where it includes selecting the predetermined alternative algorithm to generate the established flow rate of the air mass entering the engine 14.

As described above, the predetermined alternative algorithm may employ the look-up table 54 that includes a range of engine speed, engine fueling rate, and engine volumetric efficiency values versus flow rate values of the air mass entering the engine 14. Thus established flow rate of the air mass entering the engine 14 may be used by the controller 46 to regulate the combustion process of the engine itself and/or be used to regulate other devices whose operation is influenced by the air mass flow rate. In particular, the established flow rate of the air mass may also be used to regulate the regeneration of the exhaust after-treatment device 44.

While the best modes for carrying out the invention have been described in detail, those familiar with the art to which this invention relates will recognize various alternative designs and embodiments for practicing the invention within the scope of the appended claims.

The invention claimed is:

1. A method of establishing a mass flow rate of air entering an internal combustion engine, the method comprising:
   establishing an input voltage by an energy supply device to energize a mass-air-flow sensor configured to respond to the mass flow rate of air entering the engine;
   generating an output frequency via the mass-air-flow sensor in response to the mass flow rate of air entering the engine;
   determining the mass flow rate of air entering the engine using the generated output frequency;
   comparing the generated output frequency with a predetermined threshold output frequency that corresponds to the established input voltage;
   selecting the determined mass flow rate of air as the established mass flow rate of air entering the engine if the generated output frequency is at or below the predetermined threshold output frequency; and
   selecting a predetermined alternative algorithm to generate the established mass flow rate of air entering the engine if the generated output frequency is above the predetermined threshold output frequency.

2. The method according to claim 1, wherein the predetermined alternative algorithm includes a look-up table of engine speed, engine fueling rate, and engine volumetric efficiency values versus mass flow rate values of air entering the engine.

3. The method according to claim 1, wherein the mass flow rate values of air entering the engine include effects of at least one of engine exhaust gas recirculation and boost pressure generated by a compressor configured to increase power output of the engine.

4. The method according to claim 1, wherein each of said generating an output frequency, said determining the mass flow rate, said comparing the generated output frequency with a predetermined threshold output frequency, said selecting the determined mass flow rate of air as the established flow rate, and said selecting the predetermined alternative algorithm to generate the established flow rate is executed by a controller operatively connected to the engine.

5. The method according to claim 1, wherein said comparing the generated output frequency with the predetermined threshold output frequency is accomplished when the input voltage drops below a threshold value.

6. The method according to claim 5, wherein the threshold value of the input voltage is approximately 12 volts.

7. The method according to claim 1, wherein the established mass flow rate of air is used to regulate regeneration of an exhaust after-treatment device operatively connected to the engine.

8. The method according to claim 1, wherein the established mass flow rate of air is used to regulate combustion in the engine.

9. A system for establishing a mass flow rate of air entering an internal combustion engine, the system comprising:
   a mass-air-flow sensor configured to respond to a mass flow rate of air entering the engine and generate an output frequency;
   an energy supply device configured to establish an input voltage and energize the mass-air-flow sensor; and
   a controller operatively connected to the engine and programmed to:
      determine the mass flow rate of air entering the engine using the generated output frequency;
      compare the generated output frequency with a predetermined threshold output frequency that corresponds to the established input voltage;
      select the determined mass flow rate of air as the established mass flow rate of air entering the engine if the generated output frequency is at or below the predetermined threshold output frequency; and
      select a predetermined alternative algorithm to generate the established mass flow rate of air entering the engine if the generated output frequency is above the predetermined threshold output frequency.

10. The system according to claim 9, wherein the predetermined alternative algorithm includes a look-up table of engine speed, engine fueling rate, and engine volumetric efficiency values versus mass flow rate values of air entering the engine.

11. The system according to claim 9, wherein the engine includes at least one of an engine exhaust gas recirculation and a compressor configured to generate boost pressure to increase power output of the engine, and the mass flow rate values of air entering the engine include effects of the at least one of the exhaust gas recirculation and the compressor boost pressure.

12. The system according to claim 9, wherein the controller is further programmed to compare the generated output frequency with the predetermined threshold output frequency when the input voltage drops below a threshold value.

13. The system according to claim 12, wherein the threshold value of the input voltage is approximately 12 volts.

14. The system according to claim 9, wherein the controller is further programmed to regulate regeneration of an exhaust after-treatment device operatively connected to the engine by using the established mass flow rate of air.

15. The system according to claim 9, wherein the controller is further programmed to regulate combustion in the engine by using the established mass flow rate of air.

16. A vehicle comprising:
   an internal combustion engine configured to power the vehicle;
   a mass-air-flow sensor configured to respond to a mass flow rate of air entering the engine and generate an output frequency;
   an energy supply device configured to establish an input voltage and energize the mass-air-flow sensor; and
   a controller operatively connected to the engine and programmed to:
      determine the mass flow rate of air entering the engine using the generated output frequency;
      compare the generated output frequency with a predetermined threshold output frequency that corresponds to the established input voltage;
      select the determined mass flow rate of air as the established mass flow rate of air entering the engine if the generated output frequency is at or below the predetermined threshold output frequency; and
      select a predetermined alternative algorithm to generate the established mass flow rate of air entering the engine if the generated output frequency is above the predetermined threshold output frequency.

17. The vehicle according to claim 16, wherein the predetermined alternative algorithm includes a look-up table of engine speed, engine fueling rate, and engine volumetric efficiency values versus mass flow rate values of air entering the engine.

18. The vehicle according to claim 16, wherein the engine includes at least one of an engine exhaust gas recirculation and a compressor configured to generate boost pressure to increase power output of the engine, and the mass flow rate values of air entering the engine include effects of the at least one of the exhaust gas recirculation and the compressor boost pressure.

19. The vehicle according to claim 16, wherein the controller is further programmed to compare the generated output frequency with the predetermined threshold output frequency when the input voltage drops below a threshold value.

20. The vehicle according to claim 16, wherein the controller is further programmed to regulate at least one of combustion in the engine and regeneration of an exhaust aftertreatment device operatively connected to the engine by using the established mass flow rate of air.

\* \* \* \* \*